B. SCHMITZ.
Apparatus for Making Extracts of Coffee, &c.

No. 204,099. Patented May 21, 1878.

Witnesses.
Otto Hufeland
Hugo Brueggemann

Inventor.
Balthasar Schmitz.
by
Van Santvoord & Hauff
his attorneys

UNITED STATES PATENT OFFICE.

BALTHASAR SCHMITZ, OF BROOKLYN, NEW YORK.

IMPROVEMENT IN APPARATUS FOR MAKING EXTRACTS OF COFFEE, &c.

Specification forming part of Letters Patent No. 204,099, dated May 21, 1878; application filed May 3, 1878.

*To all whom it may concern:*

Be it known that I, BALTHASAR SCHMITZ, of Brooklyn, in the county of Kings and State of New York, have invented a new and useful Improvement in Apparatus for Making Extracts of Coffee and other substances, which invention is fully set forth in the following specification, reference being had to the accompanying drawing, in which—

Figure 1:
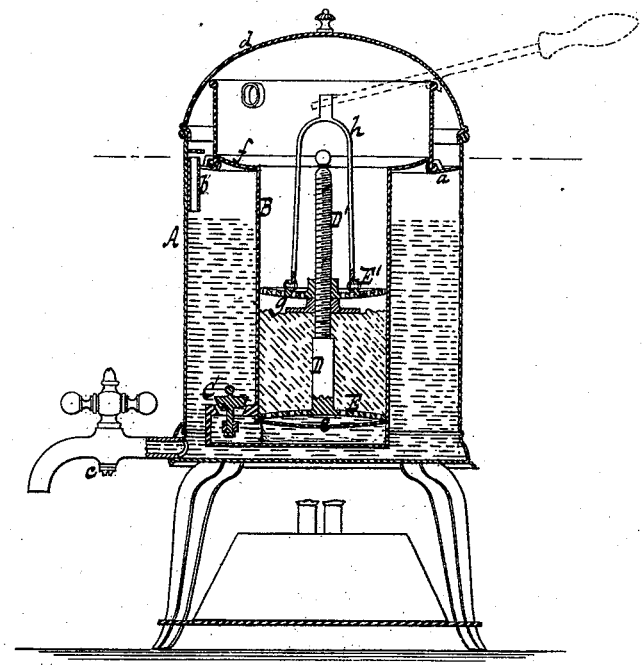
Figure 2:
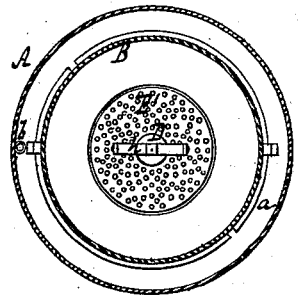

Figure 1 represents a vertical central section of an apparatus embracing my invention. Fig. 2 is a horizontal section thereof.

Similar letters indicate corresponding parts.

The object of my invention is to produce an apparatus for making extracts of coffee, tea, dye-stuffs, and other substances with an economy in time and with the least possible waste; and it consists in a reservoir containing a cylinder, which communicates therewith through a weighted valve opening in the direction of the reservoir, and a piston-rod carrying two foraminous heads, which are fitted in the cylinder, so that by filling the space between said heads with the coffee or other substance to be treated, then pouring water into the cylinder and imparting a reciprocating motion to the piston-rod, the water passes through the upper foraminous head and saturates the coffee or other substance, while the latter is caused to partake of the motion of the piston-rod, and is thus subjected to suction, whereby the aroma or color is very thoroughly and rapidly extracted therefrom, the extract being caused to pass through the lower foraminous head, and being forced into the reservoir by the displacement of the weighted valve.

I make the cylinder detachable from the reservoir, and secure thereto the weighted valve, and combine therewith a suitable locking device, so that, while the cylinder can be firmly attached to the reservoir, the interior of the latter can be laid bare when it is desirable. One of the foraminous heads of the piston-rod is adjustable lengthwise of the rod, so that the space between the two heads for the reception of the coffee or other substance can be enlarged or reduced, according to the amount used at one time.

In the drawing, the letter A designates the reservoir of my apparatus. B is the cylinder; C, the valve; D, the piston-rod, and E E' the two foraminous heads of said rod.

I make the reservoir A of cylindrical or any other shape, and, by preference, construct the same with an inwardly-projecting bent flange, $a$, in which is formed an orifice, $b$, the reservoir being, moreover, provided with a discharge-cock, $c$, and with a suitable cover, $d$.

The cylinder B is closed at the bottom, and provided with a sieve, $e$, near that point, while the valve C is secured to the outside of the cylinder at a point beneath this sieve, in any suitable manner. For the purpose of attaching or holding the cylinder B in its position within the reservoir A, I provide the cylinder with a flange, $f$, on its upper edge, and connect this flange to the flange $a$ of the reservoir by a bayonet-joint, whereby the reservoir rendered air-tight; but this can also be effected in various other ways.

The valve C is constructed to open automatically in the direction of the reservoir A, as clearly shown.

The two foraminous heads E E' are fitted in the cylinder B, and the head E is firmly secured to the lower end of the piston-rod D, while the head E' is located at an intermediate point, and is adjustable. In order to render the head E' adjustable, I have, in the example shown, provided the rod D with a screw-thread, D', and formed in the head E' a threaded hole to engage with the screw-thread of the rod. I have also placed on the rod D, beneath the adjustable head E', a jam-nut, $g$, which serves to regulate the position of the adjustable head.

The operation of my apparatus is as follows: The rod D, together with the foraminous heads E E', is lifted partially out of the cylinder B, and the space between the two heads is nearly, but not quite, filled with the substance of which an extract is to be made—say with coffee—that is to say, the substance is deposited on the lower head E in such quantity as to leave a space between the coffee and the upper head E', as shown. The object of the space just mentioned is to obviate the compression of the coffee between the heads E E', and by making the head E' adjustable this space can be preserved, whatever the quantity of the coffee may be. The parts are then returned to the cylinder B, and a sufficient quantity of boiling water poured into the same to saturate the coffee, the water being permitted to pass through the upper foraminous head E'. The whole is then left to stand a few minutes, whereby the coffee is caused to settle against the inner surface of the cylinder B, so as to form a piston or plunger fitting accurately into the cylinder. After the water has percolated through the coffee it displaces or opens the valve C and passes into the reservoir A. The rod D is then drawn upward, whereby the valve C is closed and a vacuum is created beneath the coffee, or, in other words, a suction is produced, which has the effect of extracting all the aroma or liquid therefrom, the same being permitted to escape through the lower foraminous head E, when the rod D is returned to its original position, so as to reopen the valve and force the extract into the reservoir. Any desirable quantity of water may then be poured on the coffee and forced or pumped into the reservoir A until the last particle of aroma is extracted from the coffee.

In case a greater quantity of water is forced into the reservoir A than the same is capable of holding, the surplus is allowed to escape through the orifice $b$, which also allows the air to escape from the reservoir, and hence the latter is not liable to burst. The liquid escaping from the reservoir through the orifice $b$ is caught on the bent flange $a$, and, when a portion of the liquid has been drawn from the reservoir, runs back into the same.

To permit of giving to the rod D its vertically-reciprocating motion, I provide the rod or the upper foraminous head E' with a bail, $h$, to engage with a lever, (shown in dotted outlines in Fig. 1,) or I provide the rod with a handle at its upper end.

What I claim as new, and desire to secure by Letters Patent, is—

1. The combination, in an apparatus for making extracts, of a reservoir, a cylinder situated within the reservoir, a weighted valve by which the cylinder communicates with the reservoir, and a piston-rod carrying two foraminous heads, which are fitted in the cylinder, all adapted to operate substantially as described.

2. The combination, in an apparatus for making extracts, of a reservoir, a detachable cylinder situated within the reservoir, a weighted valve which is secured to the cylinder, and by which the cylinder communicates with the reservoir, a locking device for holding the cylinder in position, and a piston-rod carrying two foraminous heads, which are fitted in the cylinder, all adapted to operate substantially as described.

3. The combination, in an apparatus for making extracts, of a reservoir, a cylinder situated within the reservoir, a weighted valve by which the cylinder communicates with the reservoir, and a piston-rod carrying two foraminous heads, which are fitted in the cylinder, and one of which is adjustable lengthwise of the rod, all adapted to operate substantially as described.

In testimony that I claim the foregoing I have hereunto set my hand this 30th day of April, 1876.

BALTH. SCHMITZ.

Witnesses:
  W. HAUFF,
  E. F. KASTENHUBER.